United States Patent [19]

Isreal et al.

[11] Patent Number: 4,723,238

[45] Date of Patent: Feb. 2, 1988

[54] INTERFACE CIRCUIT FOR INTERCONNECTING CIRCUIT SWITCHED AND PACKET SWITCHED SYSTEMS

[75] Inventors: Charles M. Isreal, Marlboro; David C. Jones, Jr., Ocean; Cheng-Jen Yang; George D. Zally, both of Holmdel, all of N.J.

[73] Assignees: American Telephone and Telegraph Company, New York, N.Y.; AT&T Information Systems Inc., Morristown, N.J.

[21] Appl. No.: 843,239

[22] Filed: Mar. 24, 1986

[51] Int. Cl.[4] .................................................. H04Q 11/04
[52] U.S. Cl. ........................................................ 370/60
[58] Field of Search ........................ 370/60, 58, 94, 85

[56] References Cited

U.S. PATENT DOCUMENTS

| 4,313,036 | 1/1982 | Jabara et al. | 179/18 |
| 4,486,878 | 12/1984 | Havermans | 370/60 |
| 4,556,972 | 12/1985 | Chan et al. | 370/94 |
| 4,592,048 | 5/1986 | Beckner et al. | 370/60 |

OTHER PUBLICATIONS

G. B. Cicchetti and A. R. Lubarsky, "Hybrid Integrated Digital Network," Proceedings of the World Telecommunication Forum Technical Synposium, 6-8 Oct. 1975, pp. 2.3.7.1-5.

J. de Smet and R. W. Sanders, "Pacuit Switching Combines Two Techniques in One Network," Computer Design, Jun. 1976, pp. 83-88.

C. J. Jenny and K. Kummerle, "Distributed Processing Within an Integrated Circuit/Packet-Switching Node," IEEE Transactions on Communications, vol. COM-24, No. 10, Oct. 1976, pp. 1089-1100.

M. J. Ross, J. H. Gottschalck and E. A. Harrington, "An Architecture for a Flexible Integrated Voice/Data Switch," IEEE 1980, CH1506, pp. 21.6.1-5 (1980 International Conference on Communications, Seattle, Wash., 8-12 Jun. 1980).

*Primary Examiner*—Douglas W. Olms
*Assistant Examiner*—Wellington Chin
*Attorney, Agent, or Firm*—John A. Caccuro

[57] ABSTRACT

An interface circuit is described for interconnecting a packet switched system to a circuit switched system which enables a uniform dialing plan to be utilized to establish intra-system or inter-system connections. This is accomplished by assigning each terminal of the packet switched system a unique terminal address similar to the extension number used for terminals of the circuit switched system. The interface also distinguishes data call set-up requests from other control commands received from the packet switched system.

10 Claims, 6 Drawing Figures

FIG. 2

TERMINAL LOCATION TABLE 201

| TERMINAL | LOCATION |
|---|---|
| 121-1 | CSS |
| ... | ↓ |
| 121-J | CSS |
| 131-1 | PSS |
| ... | ↓ |
| 131-J | PSS |

DATA CONVERTER ASSIGNMENT TABLE 202

| CONVERTER | TIME SLOT # |
|---|---|
| 145A | 2 |
| 145B | - |
| 145C | - |
| 145D | - |

NIC TERMINAL LOCATION TABLE 203

| |
|---|
| 121-1 |
| ... |
| 121-J |

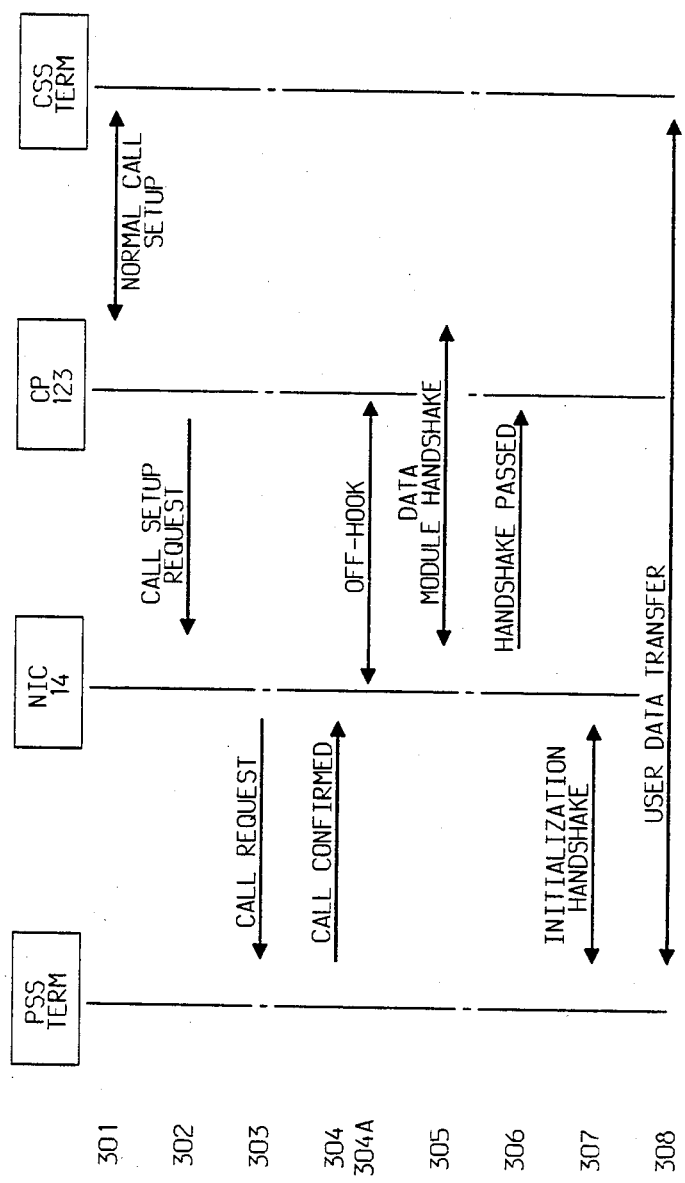

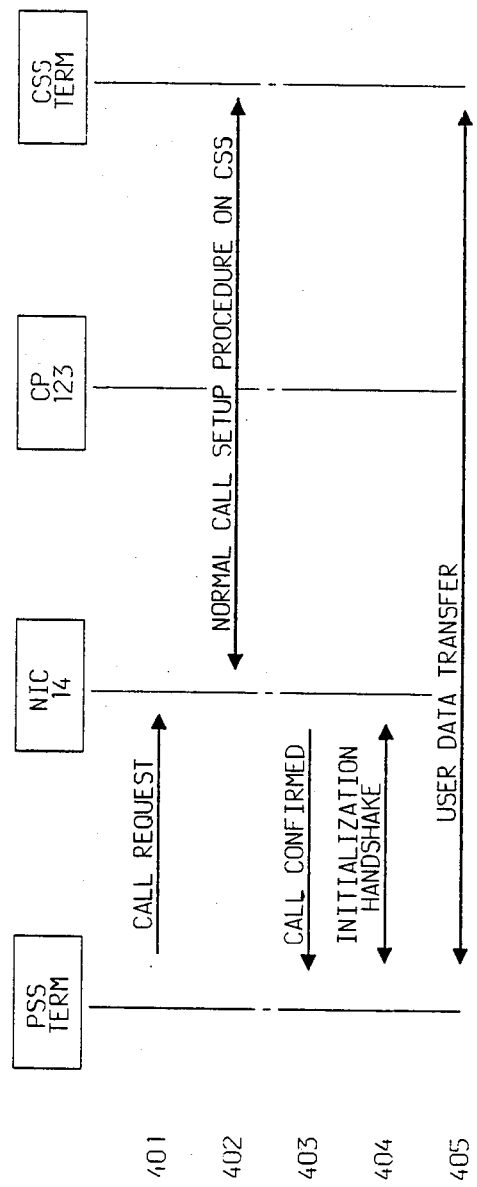

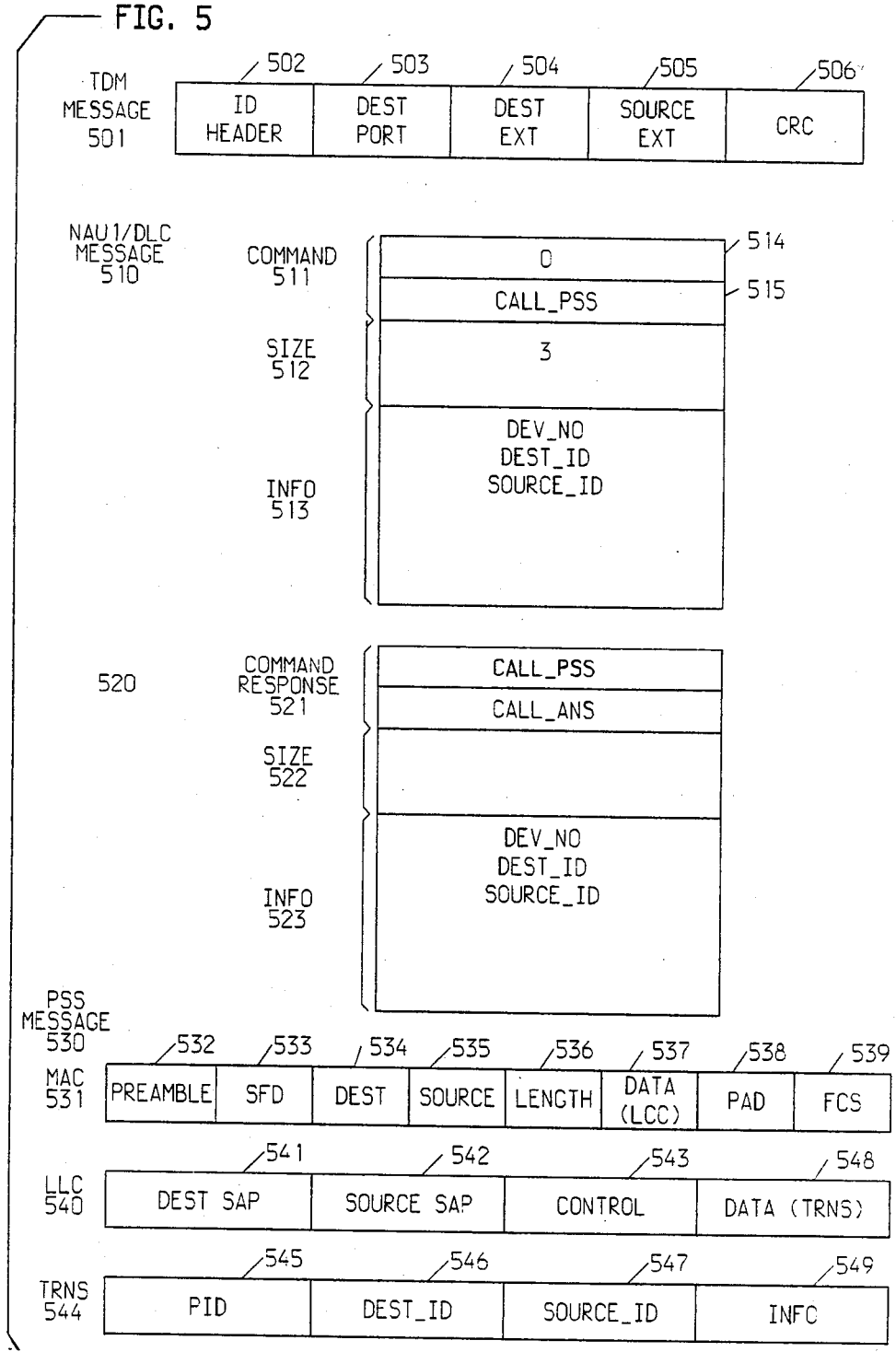

FIG. 6

| COMMANDS | | NAU1 COMMANDS | | DLC COMMANDS |
|---|---|---|---|---|
| ORIGINATE | 601 | CALL_CSS<br>DEST_ID, SOURCE_ID | 621 | CALL_PSS<br>DEV_NO, DEST_ID, SOURCE_ID |
| ABORT | 602 | ABORT_CSS | 622 | ABORT_PSS<br>DEV_NO, DEST_ID, SOURCE_NO |
| DISCONNECT | 603 | DEV_NO, DEST_ID, SOURCE_ID<br>DISC_CSS | 623 | DISC_PSS<br>DEV_NO, DEST_ID, SOURCE_ID |
| DIAGNOSTIC | 604 | DEV_NO, DEST_ID, SOURCE_ID<br>DIAG_CSS<br>MESSAGE | 624 | NONE |
| CONTROL | 605 | RX_DCP_CONTROL<br>DEV_NO, MESSAGE | 625 | TX_DCP_CONTROL<br>DEV_NO, MESSAGE |
| DOWN LOAD | 606 | NONE | 626 | DOWN LOAD_CSS<br>TABLE 201 |
| CONFIGURATION | 607 | NONE | 627 | DEV_CONFIG<br>DEV_NO, PARAMETERS |
| SANITY | 608 | NONE | 628 | SANITY_CHK<br>NONE |
| RESPONSES<br>ANSWERED | 609 | CALL_ANS<br>DEV_NO, DEST_ID, SOURCE_ID | 629 | CALL_ANS<br>DEV_NO, DEST_ID, SOURCE_ID |
| BUSY | 610 | NONE | 630 | CALL_BUSY<br>DEST_ID, SOURCE_ID |
| UNAVAIL | 611 | NONE | 631 | DEV_UN<br>DEST_ID, SOURCE_ID |
| DENIED | 612 | CALL_DEN | 632 | CALL_DEN<br>DEST_ID, SOURCE_ID |
| ERROR | 613 | COM_ERR<br>DEV_NO, DEST_ID, SOURCE_ID | 633 | COM_ERR<br>DEV_NO, DEST_ID, SOURCE_ID |
| CHECK DONE | 614 | CHECK_DONE<br>DLC | | |

1

INTERFACE CIRCUIT FOR INTERCONNECTING CIRCUIT SWITCHED AND PACKET SWITCHED SYSTEMS

Field of the Invention

This invention relates to a circuit switched digital communication system and, more particularly, to a circuit for interfacing a circuit switched system to a packet switched system.

BACKGROUND OF THE INVENTION

Typically, digital communication systems utilize circuit switching, i.e., time-division multiplexing (TDM), to provide voice and data communications between various voice stations and data terminals of the system. Increasingly, many applications require the circuit switched system to interconnect to a packet switched system. Optimal utilization of this interconnection requires that terminals and ports of the packet switched system be able to transfer data and effectuate control on terminals and ports of the circuit switched system and vice-versa. In the prior art, communications between a terminal of a circuit switched system and a terminal of a packet switched system required first establishing a dialed connection to the interface circuit and then establishing a dialed connection between the interface and the called terminal on the packet system. Thus, inter-system connections typically require an extra dialing step, compared to intra-system connections, which resulted in a time-consuming and inefficient operation.

What is desired is single-stage or direct dialing to eliminate the extra layer of system administration required on inter-system call set-up and a uniform terminal addressing plan across both systems to eliminate address translation on inter-system calls.

SUMMARY OF THE INVENTION

According to the present invention, a network interface circuit is described which interconnects a packet switched system to a circuit switched system and enables single-stage call set-up using a uniform addressing plan for establishing intra-system or inter-system connections.

According to the present invention, each terminal of the packet switched system is assigned a unique symbolic terminal address similar to the extension number for circuit switched system terminals. A terminal location table on the network interface circuit stores information defining the system in which each terminal is located. When an originating terminal of either system sends an inter-system call set-up message including the symbolic terminal address of the destination terminal, the network interface circuit converts the message into the proper format for establishing the call to the addressed destination terminal on the other system.

The network interface circuit includes: a first subunit which connects to the packet switched system and functions as a port circuit thereof; a second subunit which connects to the circuit switched system and functions as a port circuit thereof; one or more data converter circuits for providing data communications between the subunits; and a dual-port memory for providing control signaling between the subunits. Each data converter circuit is not dedicated to a port circuit of the circuit switched system but, rather, is assigned on a per-inter-system-call basis. Thus, once a call is determined to be an inter-system call, using the terminal location table, the interface circuit assigns a data converter circuit to handle data communications during the call.

According to another aspect of the invention, the interface distinguishes terminal-to-terminal data call setup information from call control commands received from the packet switched system.

BRIEF DESCRIPTION OF THE DRAWING

The foregoing as well as other objects, features, and advantages of our invention will be more apparent from a description of the drawings in which:

FIG. 2 shows tables used by the network interface controller and the call processor of the circuit switched system;

FIG. 3 shows a call set-up sequence for a data call from a circuit switched system terminal to a packet switched system terminal;

FIG. 4 shows a call set-up sequence for a data call from a packet switched system terminal to a circuit switched system terminal;

FIG. 5 shows the various message formats used for establishing inter-system communication; and FIG. 6 shows the commands utilized by the network access unit (NAU) and the digital line circuit (DLC) subunits of the network interface controller.

GENERAL DESCRIPTION

Figure 1:
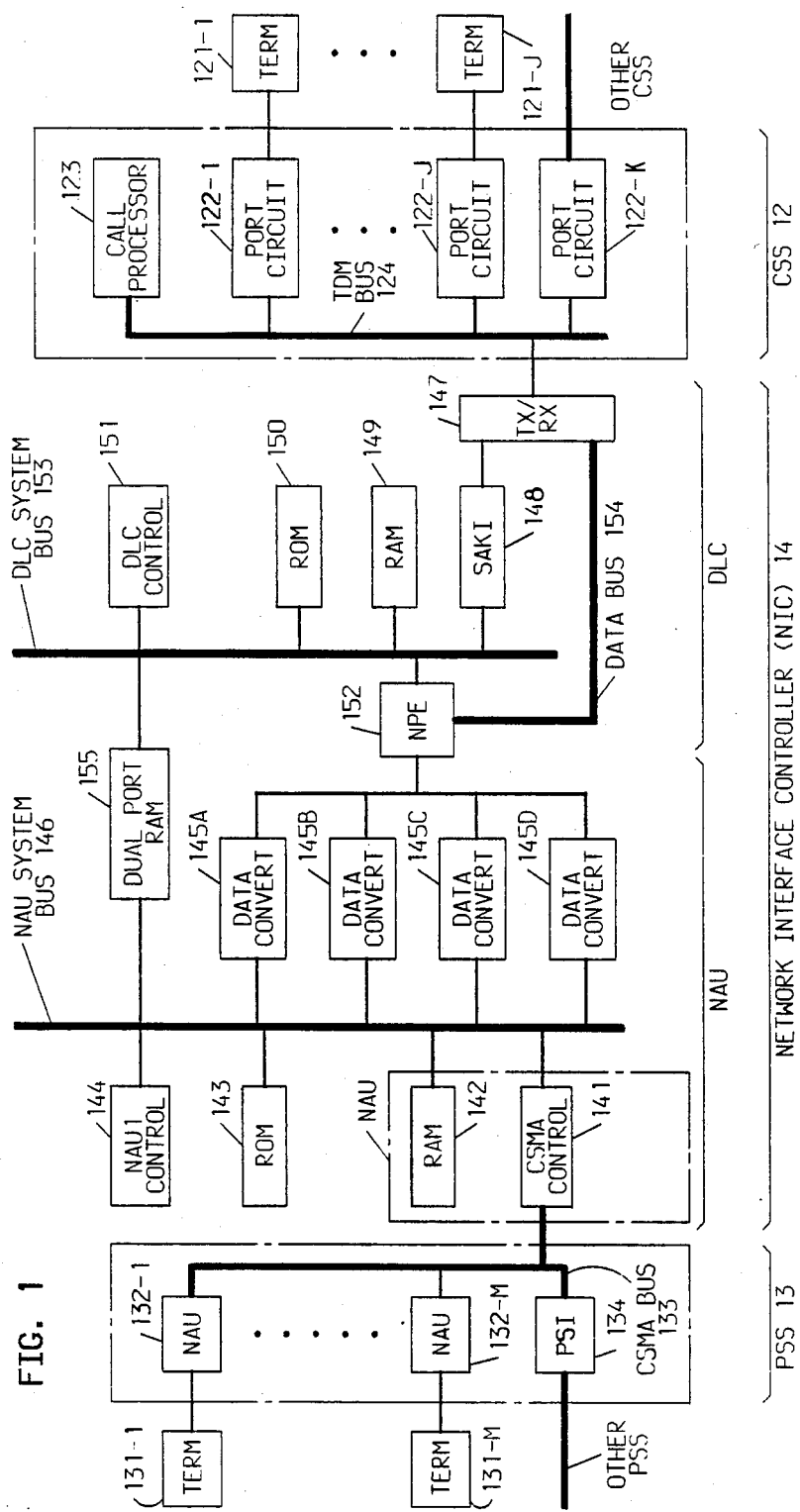
FIG. 1 shows a block diagram of the network interface controller circuit and its connection to both a packet switched system and a circuit switched system.

FIG. 1 illustrates a network interface controller (NIC) 14, according to the present invention, which interfaces a circuit switched system (CSS) 12 to a packet switched system (PSS) 13. The CSS uses a time-division multiplexed (TDM) bus 124 for communications between terminals involved in a voice or a data call. The PSS uses a packet bus for transmitting data between terminals.

The CSS includes a call processor 123 connected over TDM bus 124 to a plurality of port circuits (PC) 122-1 through 122-J for interfacing voice and/or data terminals 121-1 through 121-J, respectively, to the system. Thus, CSS controls both voice and data calls. Port circuit 122-K provides access to other circuit switched systems. The circuit switched system may be, for example, an AT&T System 75 Digital Communication System as described in the article entitled "System 75: Communications and Control Architecture" by L. A. Baxter et al, published in the AT&T Technical Journal, Jan. 1985, page 153 et seq.

The PSS may be a well-known local area network, such as an AT&T Starlan network, which includes a group of network access units (NAU) 132-1 through 132-M. Terminals 131-1 through 131-M communicate via NAU 132-1 through 132-M, respectively, to establish calls between themselves over packet (CSMA) bus 133 of the PSS. The NAUs compete with each other for access to packet bus 133. Packet system interface (PSI) 134 provides access to other packet switched systems. The operation of the Starlan network NAU is described in "The STARLAN Network Technical Reference Manual" (999-300-208IS), published by AT&T Information Systems.

The NAUs (132-1–132-M) enable terminals 131-to 131-M to communicate on packet systems to each other. The software driver for NAUs typically includes (1) a command interpreter to interact with the terminal using a common language, (2) a macro command expander which breaks down a macro command into a series of commands for the distant terminal, and (3) a response analyzer which reacts to responses from the distant machine, including various kinds of faults and retries. The NAUs also include a contention resolution circuit for determining when the terminal can access CSMA bus 133.

According to the present invention, NIC 14 enables a data terminal of CSS 12 to communicate with other terminals of CSS 12 or with a terminal of PSS 13, or viceversa, using single-stage dialing. Single-stage dialing eliminates an extra layer of system administration. Moreover, a uniform addressing plan assigns terminals on CSS 12 and PSS 13 unique addresses, thereby eliminating address translation for inter-system calls. Thus, the dialing of a data call on CSS 12 is the same whether it is an intra-system or inter-system data call. Similarly, intra-system and inter-system calls on PSS 13 can utilize the same uniform dialing plan.

For example, a data call between originating terminal 121-1 on CSS 12 and destination terminal 131-M on PSS 13 would basically be established as follows: Terminal 121-1 dials a data call request to call processor (CP) 123. The CP 123 checks a terminal location table (201 of FIG. 2) to determine if the destination terminal 131-M is located in CSS 12 or PSS 13. Since destination terminal 131-M is located on PSS, CP 123 forwards the call request to NIC 14. The NIC 14 acts like a terminal on PSS 13 and attempts to complete the data call to destination terminal 131-M. If the data call set-up on PSS 13 is successful, NIC 14 notifies CP 123 accordingly. The CP 123 then selects a data converter (e.g., 145D) for the call and sends an appropriate message back to the originating terminal 121-1. The data transmission path for the established data call includes originating terminal 121-1, port circuit 122-1, TDM bus 124, T/R 147, data bus 154, NPE 152, data converter 145D, NAU bus 146, CSMA interface controller 141, NAU 132-1 and destination terminal 131-M.

If the call set-up fails on PSS 13, NIC 14 notifies CP 123 of the failure and CP 123 terminates the call attempt and signals originating terminal 121-1 accordingly.

By contrast, a data call between originating terminal 121-1 and destination terminal 121-J, both terminals of CSS 12, proceeds via port circuit 122-1, TDM bus 124 and port circuit 122-J under control of call processor 123 and in accordance with the normal operating procedures of CSS 12. As before, call processor 123 utilizes its terminal location table 201 to determine that the data call is an intra-system call. That is, both originating terminal 121-1 and destination terminal 121-J are located in system CSS 12.

Similarly, a data call between an originating terminal 131-1 on PSS 13 to a destination terminal 121-J on CSS 112 basically proceeds as follows: Terminal 131-1 sends a data call request to NIC 14 which checks terminal location table (203 of FIG. 2) to determine the location of destination terminal 121-J. Note, table 203 contains only valid CSS 12 terminal address information. Since destination terminal 121-J is located in CSS 12, NIC 14 reformats the request and forwards it to CP 123 of CSS 12. NIC 14 then selects an idle data converter (e.g., 145A) to initiate the call. The call processor CP 123 tries to complete the call if destination terminal 121-J is available for a call. the CP 123 assigns talk and listen time slots on TDM bus 124 for data communications between destination terminal 121-J and NIC 14. Then NIC 14 sends a confirmation back to originating terminal 131-1 to complete the data call. Data communication then proceeds from originating terminal 131-1, NAU 132-1, CSMA interface controller 141, data converter 145A, NPE 152, transceiver 147 and port circuit 122-J to destination terminal 121-J.

If the destination terminal 121-J on CSS 12 is not ready to accept a call, CP 123 signals NIC 14 which sends a call-denied message to the originating terminal to terminate the data call.

According to another aspect of the present invention, a terminal on PSS 13 communicates call control information to CP 123 on CSS 12. An originating terminal (e.g., 131-M) sends a call processor service request to NIC 14. The NIC 14 reformats the request and forwards the request to CP 123. The CP 123 recognizes that the request is a control information request and not a data call request. The CP 123 and the originating terminal then exchange control information through NIC 14. This control information exchange occurs over the control channel of the TDM bus 124, transceiver 147, SAKI 148, DLC bus 153, dualport memory 155, CSMA interface controller 141 and NAU 132-M to originating terminal 131-M.

The following description will use reference numbers which refer to different figures. When a reference number is utilized in the description, the element associated with that reference number is located on the figure having the same number as the first digit of the reference number (e.g., 121-1 is located on FIG. 1).

Circuit Switched System (CSS) Operation

The DLC subunit of NIC 14 includes NPE 152, DLC controller 151, ROM 150, RAM 149, SAKI 148 and transceiver 147, all connected via DLC bus 153 and data bus 154 as shown in FIG. 1. The DLC subunit is and functions essentially as another port circuit (e.g., 122-1) of CSS 12. Thus, calls can be established between any of the terminals 121-1 to 121-J and DLC over TDM bus 124.

The above-identified units of DLC operate as described on page 162 of the previously referenced article entitled "System 75: Communications and Control Architecture" by L. A. Baxter et al.

Bus transceiver 147 interfaces the port circuit 200 to TDM bus 124. The time-slot information from TDM bus 124 includes control information and data. The data may be either digitized pulse code modulation (PCM) voice samples or digital data. These data are converted to and from the TDM format by network processing element (NPE) 152. A control interface SAKI 148 connects to DLC controller 151 via DLC bus 153. The control interface SAKI 148 receives and transmits control information over the TDM bus 124 and the DLC controller 151 transmits and receives information over data bus 154.

The DLC controller 151, ROM 150 and RAM 149 circuits perform functions common to all port circuits and specific-application functions which are unique to a particular type of port circuit. The DLC controller 151 carries out the port circuit's particular function and enables it to communicate with system call processor 123.

A user originates a call by going off-hook on his/her terminal (e.g., 121-1). This change is detected by a port circuit (122-1) and an off-hook message is sent to the call processor 123. On receiving this message, the resources for processing this call are allocated and messages are sent for giving dial prompt to the user.

The call processing software interprets each digit entered by the user and routes the call to the termination station via TDM bus 124 when all the digits have been entered. The format for this TDM message is 501. The call is signaled to the terminating user with a ringing message, and the call progress is indicated to the originating user with a ringback message. When the terminating user answers the call, call processor 123 removes the ringing and ringback messages with a ringback-removed message and establishes a talk/listen path between the originator and the terminator. The talk/listen path utilizes separate time slots for the transmit and receive paths as assigned by call processor 123. Finally, when either the originator or the terminator goes on-hook, the call processing software tears down the circuit connection and deallocates all the resources associated with the call.

Packet Switched System (PSS) Operation

The NAU1 subunit of NIC 14 includes NAU1 controller 144, ROM 143, RAM 142, and CSMA interface controller 141 connected via NAU1 bus 146. The NAU1 subunit functions similar to another network access unit NAU (e.g., 132-1). Thus, data calls can be established between any of the terminals 131-1 to 131-M and NAU1 over CSMA bus 133. Communication between NAUs and NAU1 utilize the PSS message format 530. This message 530 uses the data link level protocol of the well-known International Standard Organization (ISO) protocol. This level of protocol provides administration and error detection for data transport between network access units (NAU) of PSS 13.

As previously noted, NAU1 acts like just another network access unit (NAU) of PSS 13. The data link level includes two sublayers, media access control (MAC) 531 and logical link control (LLC) 540. The MAC 531 includes sync preamble 532, start-of-frame delimiter 533, destination address 534, source address 535, length field 536 for data field 537, packet padding to achieve minimum packet size 538 and frame check sequence 539. Data field 537 contains the LLC sublayer 540 address. Destination address 534 is used to identify the destination station on PSS 13. Source address 535 identifies NIC 14 as the sending location.

The LLC sublayer includes destination service access point 541, source service access point 542, control word 543 and data field 548. The data field 548 contains TRNS address 544. The present embodiment does not utilize the network layers of the ISO protocol. The transport layer level of the ISO protocol is illustrated by TRNS 544. The TRNS layer provides connectionless (datagram) and connection (virtual circuit) oriented grades of service for data transfer. In both types, the addressing information is conveyed for selection of the endpoints following a particular level 2 MAC 531 address. The TRNS layer 544 includes PID encodings 545, DEST_ID 546 (which is the DEST_ID in INFO 513), SOURCE_ID 547 (which is the SOURCE_ID in INFO 513) and information 549 to be conveyed to the destination.

According to the present invention, virtual circuits are used for data calls between terminals of PSS 13 and terminals of CSS 12. The datagram service is used according to another feature of the present invention for sending call control messages from a terminal on PSS 13 to call processor 123. This will be described in a later section of this application.

As noted, data calls are provided using the connection-oriented grade of service which provides a terminal-to-terminal virtual circuit connection. There are two types of packets defined in this type of service—call control packets and data transfer packets. The call control packets include the call request (CR), call confirm (CC), call disconnect (CD) commands, etc.

To initiate a data call, a call request (CR) is used to request the establishment of a virtual circuit connection between, for example, CSMA interface controller 141 and destination address NAU 132-1. Once the call, or virtual circuit, is established, the data transfer packets are used to transfer data. The data transfer packets include control only (CO), mixed data (MD), and data only (DO) to communicate, respectively, control messages, control and data, and blocks of user data. At the conclusion of a data call, a call disconnect (CD) command is used to terminate the call.

NAU1/D LC Operations

With reference to FIGS. 1 and 5, communication between NAU1 and DLC subunits of NIC 14 utilize dual-port memory 155 for control messages and data converters 145A–145D for data transfers. Dual-port memory 155 operates in the well-known manner to transfer these control messages 510. Generally, data converters 145A–145D include a first-in-first-out (FIFO) and control circuit which enable information in packet form to be received from NAU1 and converted into the TDM format for DLC. Conversely, data converters 145A–145D also package TDM format data from DLC for transmission in packet form to NAU1. The data converter encodes a byte of data in high-level data link control (HDLC) format and transmits the converted data on the TDM bus 124, and decodes the data received from the TDM bus into data bytes directly readable by CPU 123.

NAU1/DLC messages 510 are used for communication between NAU1 controller 144 and DLC controller 151 which takes place via dual-port memory 155. Message 510 includes a command field 511, size field 512, and information field 513. The command field contains two bytes, 514 and 515. This field is loaded by the command sender and unloaded by command receiver. Hence, for a call initiated by CSS, CSS is the command sender and PSS is the command receiver, and vice-versa.

The size field 512 contains the length in bytes of the information field 513. The information field includes any appropriate information required by the command stored in the command field 514.

Control communications between subunits NAU1 and DLC utilize commands issued through dual-port memory 155 one at a time. Whenever a command is to be issued, the command sender checks that command field 511 is zero. If the command field is zero, any parameters associated with the command are written into the information field 513 and the size data written into size field 512. The command information is written into the command field last. A nonzero value in the command field indicates to the command receiver that the message 510 is completely written and ready to be used. After receiving NAU1/DLC message 510, the command receiver clears the command field 511 indicating that the command is being processed and the next command may be given.

For example, if DLC controller 151 is the command sender, it sends originate call command 601 in the format shown in message 510 to the command receiver, NAU1 controller 144. NAU1 controller 144 communicates the information to CSMA interface controller 141 which then formats the information into the PSS message shown in 530 for transmission to the destination terminal on PSS 13.

The variety of commands and responses which can be communicated between NAU1 and DLC are listed in FIG. 6. There are two classifications of commands: unsolicited commands 601-608 and command responses 609-613. Note that an unsolicited command is distinguished from a command response by the content of the first byte. With reference to 511 and 521, unsolicited commands have the first byte equal to zero while command responses have the first byte equal to the unsolicited command which is being responded to. In all commands and command responses, the source number (SOURCE_ID) and destination number (DEST_NO) are always included in the information part (513) of the message. Note, the converter device number (DEV_NO) is not always required in commands and responses as shown in FIG. 6.

During the process of making a call from a terminal of PSS 13 to a terminal of CSS 12, a command 601 such as CALL_CSS is used. Command 601 is formatted as shown in message 510 except that 515 would be CALL_CSS and 513 includes the destination number (DEST_ID) and source number (SOURCE_ID) but does not include converter device (DEV_NO) information (since that has yet to be determined by CSS 12).

The possible responses from DLC include call answered 629, call busy 630, converter unavailable 631 and call denied 632. All of these command responses identify the source and destination numbers. Call answered means that CSS 12 has answered the call. CSS 12 includes a DEV_NO in the command response since one has been assigned. Call busy means that the destination terminal is busy. Converter unavailable means that all converter devices (145A-145D) are in use or reserved by DLC and hence no data communication is possible at this time. Converter devices are reserved each time a data call request is received by call processor 123 from a terminal or either system PSS or CSS. However, a DEV_NO is only assigned and returned in a command response when a call is answered 609.

A pending data call is aborted using the abort command shown in 602. This abort command 602 issued from NAU1 when it received no response from DLC for a predetermined period of time after the originate call command 601 was sent. In response, DLC terminates the call set-up attempt and sends an error command 633 to NAU1.

When a data call is to be terminated, NAU1 sends a disconnect call command 603 to DLC identifying the destination and source numbers. DLC returns an error command 633 if no such call connection exists. If a call connection exists, no response is required from the DLC and the call is taken down.

When NAU1 detects an unexpected/error condition, it reports the error to DLC using diagnostic command 604. DLC forwards this error message to call processor 123 to provide an error logging capability.

As will be discussed in a later paragraph, NAU1 receives control messages which are identified by the control headers in the data frame received from data converters (145A-145D). NAU1 does not interpret these control messages but rather forwards the entire frame to DLC using control message 605. The size of the control message is calculated by subtracting one from the value of the size field (SIZ).

The process of making a call from a terminal of CSS 12 to a terminal of PSS 13 generally utilizes the same commands and receives the same command responses as the calls initiated from PSS 13 to CSS 12 as described in the preceding paragraphs.

The origination of a call from a terminal of CSS 12 to a terminal of PSS 13 uses command 621. Responses from PSS 13 include only call answered 609 and call denied 612; no call busy 610 or device unavailable 611 is utilized.

Disconnecting a call utilizes command 623 with no response being necessary unless no such call connection existed, in which case an error response 613 is made.

A CSS 12 call attempt is aborted using command 622. This command terminates the call set-up attempt and clears the previous call originate command 621. NAU1 responds with a command error 613 if no such call set-up attempt exists between the destination and source numbers.

Control message 625 is used to send control messages from DLC of NIC 14 to a remote port circuit (e.g., 122-1) of CSS 12. NAU1 identifies the control message as such from the control header (TX-DCP). NAU1 upon receiving this control command inserts the entire message into the data stream going through the designated converter device (DEV_NO) to the identified port circuit. Examples of DCP control messages are EIA updates and data module handshake messages. There is no command response message from NAU1 in response to control message 625.

The DLC download command 626 enables call processor 123 of CSS 12 to download terminal location table 203 to NAU1. As previously noted, this table indicates the valid terminal numbers of system CSS 12. According to the preferred embodiment, rather than list each terminal present on system CSS 12, groups of ten terminals are listed, thereby reducing the size of table 201. Hence, if the terminal group number is listed in table 201, all members of that group are also located on system CSS 12. There is no command response message expected from NAU1 in response to download command 626.

The converter configuration command 627 is used by DLC after a successful handshake between the originating source terminal of CSS 12 and the destination terminal of PSS 13. DLC sends configuration information to set up the proper data transfer baud rate on the assigned converter device (e.g., 145A). This command also enables NAU1 to start transferring data received from the terminal on PSS 13 to the terminal on CSS 12. Data received from PSS 13 prior to this command is buffered in the assigned converter device. There is no command response message due from NAU1 in response to this configuration command.

The DLC is responsible for checking the sanity of NAU1. The sanity check command 628 is utilized periodically to accomplish this function. The NAU1 must respond with the check done command response 614 within a predetermined period of time. Otherwise, DLC considers the NAU1 insane and both DLC and NAU1 enter a reset sequence. During such a reset sequence, all calls on the network interface controller (NIC) are terminated.

Inter-System Data Calls

The following paragraphs describe the steps for setting up calls between CSS terminals and PSS terminals. In the present embodiment, assume that NAU1 subunit of NIC 14 operates in either a gateway mode or a bridge mode. In the gateway mode, the PSS universal receive protocol (URP) is terminated on NAU1. In the bridge mode, the URP protocol is preserved across the two systems. These two modes enable the present invention to accommodate communications between different combinations of data devices or terminals connected to the PSS and CSS systems.

Terminal on CSS to Terminal on PSS

The following description makes joint reference to FIGS. 1, 2, 3, 5, and 6. Assume source terminal 121-1 on CSS desires to set up a data call to destination terminal 131-1 on PSS using a gateway mode. The user at terminal 121-1 establishes a data call by dialing the extension number of the destination terminal 131-1 in the normal manner (301) as previously described. Call processor 123 of CSS receives the dialed extension number and checks terminal location table 201 to determine whether the port associated with the destination terminal extension is located in system PSS or CSS. Terminal location table 201 is located in both CP 123 and in RAM 142 of NAU1. The terminal location table 201 in CP 123 is generated by the system CSS administrator and contains a list of all dialable terminal numbers on CSS 12. This list is downloaded to RAM 142 of NAU1 from CP 123 when CSS is initialized. Terminal location table 203 is constructed based upon this list.

Returning to our example, call processor 123 determines from table 201 that destination terminal 131-1 is located on PSS (202). Call processor 123 then sends both the destination terminal number 131-1 and the source or originating terminal number 121-1 over TDM bus 124 using the message shown in 501. Message 501 includes a header 502 to identify whether port circuit 122-1 to 122-K or DLC is to receive the information. In our example, since the destination terminal extension is located in PSS, the DLC address is inserted in header 502.

Call processor 123 also checks data converter table 202 for an available data converter device 145A-145D. Call processor 123 then sends a ringer-on downlink message to DLC to indicate an incoming call. Upon receiving the ringer-on message, DLC sends an ID request message uplink message to call processor 123. Call processor then sends message 501 with data converter device number in 503, the destination terminal extension inserted in 504 and the source terminal extension in 505.

Message 501 is received by SAKI 148 via transceiver 147 and forwards the information over bus 153 to DLC controller 151. DLC controller 151 reformats the content of message 501 into message format 510.

The destination number is needed by network interface controller NIC to set up the call to the destination terminal on PSS 13. The source number is required by the PSS protocol for call set-ups. Since NIC has only one PSS physical address, the source number is used to identify NIC as the calling PSS port. The source number can also be used by the application as the basis on which to accept or reject the call. Although NIC can use a dummy source number for port identifications, the receiver cannot use it for caller identification.

The originate call command 621 to PSS 13 is formatted as shown in message 510 to identify, in 513, the destination terminal number, source terminal number and converter device number. During step 302, this originate call command enters dual-port memory 155 where it is retrieved by NAU1 controller 144. In step 303, NAU1 controller causes CSMA interface controller 141 to start a call request on PSS 13. The CSMA interface controller reformats the call request from message format 510 into PSS message format 530.

The call request includes a call inquiry command to NAU 132-1 to get the physical address which corresponds to the destination number. NAU 132-1 recognizes its destination number and sends a call inquiry response specifying its physical address to CSMA controller 141. CSMA controller 141 then sends a call request to NAU 132-1 and requests to place a call on CSMA bus 133 using physical address. NAU 132-1 responds with either a call confirm message or a call disconnect message.

Assuming a call confirm message, NAU1 controller converts the call confirm message into a command response message format 520. The message 520 is then sent via dualport memory 155 to DLC and via SAKI 148 is converted to an off-hook response in format 501 and sent to call processor 123 (step 304A).

Call processor 123 then assigns time slots to the end points for data communication. A data module handshake, step 305, is made to ensure a compatible connection between NIC 14 and terminal 121-1. For example, the data transfer rate has to match between NIC 14 and terminal 121-1. Thereafter, the call set-up is completed in step 306. NIC 14 and terminal 131-1 exchange URP initialization INIT handshake to determine URP protocol parameters (such as buffer sizes). After a successful INIT handshake, step 307, NIC 14 goes into the data transfer mode, step 308, permitting data flow between originating terminal 121-1 and destination terminal 131-1. This data transfer occurs via NAU 132-1, CSMA interface controller 141, RAM 142, NAU1 controller 144, converter device 145A, NPE 152, transceiver 147 and port circuit 122-1. Note that the control messages of the data transmission get back to DLC controller 151 from the converter device 145A via NAU system bus 146 and dual-port memory 155.

Data transfer on CSS occurs in the predetermined time slot, one or more bytes of data per frame, between terminal 121-1 and NIC 14. Each frame is encoded in HDLC which has a header and a CRC error code sequence. Converter device 145A does a CRC error check and checks the framing and then strips off the CRC error sequence. The output of converter device 145A is the header and data which is read by NAU1 controller 144. NAU1 controller 144 then appends the data to a destination number, logical channel number, and sends it via RAM 142 to CSMA interface controller 141. CSMA interface controller 141 collects the data to form a packet and then transmits the packet over CSMA bus 133 to NAU 132-1.

A bridge mode data call from an originating terminal 121-1 on CSS 12 to terminal 131-1 on PSS 13 proceeds as follows. Generally, the difference between a bridge mode data call and a gateway mode data call is that in bridge mode, the originating terminal 121-1 is responsible for call set-up on PSS 13. In gateway mode as described earlier, NIC 14 completes the call set-up on PSS 13.

Command Mode's Terminal Dialing is used by an originating terminal on the CSS to initiate a data call to a terminal on PSS 13. Since the specific PSS terminal extension number is used, CSS 12 knows that it is a bridge mode call to PSS 13. Call processor 123 sends both destination and source extension numbers to NIC 14 together with the information that it is a bridge mode data call request. If a converter device is available, NIC 14 answers the data call right away without starting a call set-up process on PSS 13. NIC 14 and the originating port circuit 122-1 handshake with each other as in the gateway mode. After the data call set-up is successful on CSS 12, the originating terminal on CSS 12 starts the call set-up to the destination terminal on PSS 13. Hence, the originating terminal on CSS 12 is a virtual terminal on CSMA bus 133. NIC 14 plays the role of data translator in this case. It converts the data between the format used on PSS and that on CSS.

Terminal on PSS to Terminal on CSS

The following description makes joint reference to FIGS. 1, 2, 4, 5 and 6. Assume terminal 131-M on system PSS 13 wants to originate a data call to terminal 121-J on system CSS 12. Terminal 131-M does the normal call set-up process on system PSS 13. This includes a call inquiry command from terminal 131-M to NAU1 of NIC 14 to obtain the physical address of NAU1. NAU1 sends its physical address in a call inquiry response to terminal 131-M. Terminal 131-M sends a call request message 401 to NAU1 including the originating extension number (i.e., terminal 131-M extension number) and the destination extension number (i.e., terminal 121-J on system CSS 12). Note, the originating terminal extension number is supplied by the originating station on PSS 13 whereas, on calls originating from CSS 12 terminals, call processor 123 knows the extension number from an internal table (not shown).

After receiving the call request, NAU1 controller 144 checks terminal location table 201 to determine whether terminal 121-J is located on system PSS 13 or CSS 12. If the destination terminal is on CSS 12, then NAU1 returns a call pending message to terminal 131-M. Note, the source terminal extension number is also used by call processor 123 to determine access restrictions for calls originated on either system PSS 13 or CSS 12.

NAU1 controller 144 sends an originate data call command 601 to DLC including the destination and source number using message format 510. DLC converts the call origination command into the TDM message format 501 and forwards it via SAKI 148, transceiver 147, TDM bus 124 to call processor 123. Call processor 123 proceeds with the normal call set-up procedure 402 and assigns a time slot associated with one of the converter devices (145A-145D) which is selected for use during this data call. Call processor 123 confirms the call 403 and sends the time slot number and converter device number via transceiver 147 and SAKI 148 to DLC controller 151. DLC controller 151 then loads the assigned data converter in converter assignment table 202 in NPE 152 with the time slot number assigned. Thus, for example, in table 202 converter 145A is assigned time slot 2. DLC controller 151 proceeds with the standard data module handshake 404 with port circuit 122-J associated with destination terminal 121-J. This handshake sequence ensures that NIC 14 knows what operation parameters (e.g., data rate) the CSS 12 destination terminal 121-J needs.

After a successful handshake, destination terminal 121-J goes to connected mode. Call processor 123 then signals DLC controller 151 to send call answered command 629 in message format 520 to NAU1 controller 144. NAU1 controller 144 causes CSMA controller 141 to send a standard call confirmation packet to originating terminal 131-M on PSS 13. DLC controller waits a predetermined time after the successful handshake with destination terminal 121-J for a bridge mode indication (null packet) therefrom.

If no bridge mode indication is received, DLC controller 151 assumes a gateway mode and proceeds with the data call set-up on PSS 13. The call set-up procedure on PSS 13 includes an initialization handshake between NAU1 controller 144 and NAU 132-M. After a successful call set-up, NIC 14 converts between the DCP mode of system CSS 12 and the data format to be used on PSS 13. Data transfer 405 between originating terminal 131-M of PSS 13 and destination terminal 121-J occurs via NAU 132-1, CSMA interface controller 141, RAM 142, bus 146, NAU1 controller 144, converter device 145A, NPE 152, transceiver 147 and port circuit 122-J. CSMA interface controller receives the data packets from originating terminal 131-M and stores them in RAM 142. NAU1 controller 144 processes the data a byte at a time and sends the data to converter device 145A which encodes the input data into DCP format and then outputs the information to NPE 152. NPE 152 places the data byte in the correct time slot for transmission over TDM bus 124 to terminal 121-J.

If a bridge mode is indicated, by a null packet sent to NAU1 control 144 by destination terminal 121-J, the following call procedure results: NAU1 144 would then forward the call request message to destination terminal 121-J. The data call set-up now takes place directly between the originating terminal 131-M on PSS 13 and the terminating terminal 121-J on CSS 12.

Terminal on PSS to Call Processor of CSS According to another feature of the present invention, call control messages can be sent from a terminal on PSS 12 to call processor 123. As previously described, this feature utilizes the datagram service (connectionless service) capability provided by the TRNS sublayer 544 of the ISO protocol shown in FIG. 5. Datagram service is provided by the link layer in which packets of information are not sent over virtual circuits; the destination address is provided in the packet and no explicit acknowledgment is returned.

Normally, a terminal on CSS 12 can only exchange call set-up information with the call processor 123. In other words, a terminal can only request to make a call, disconnect a call, put a call on hold, etc. In our invention, a generalized mechanism is provided for the terminals on PSS 13 to communicate with CP 123 through NIC 14. When a terminal (e.g., terminal 131-1) wants to talk to CP 123, it uses a call inquiry command in format 530 to find out the PSS physical address for NIC 14. Then a specific PID 545 is used to indicate that the packet is for CP 123 from a PSS 13 terminal. NIC 14 in this case acts as a protocol translator to convert data format between PSS and CSS for transmission on the control channel to CP 123. The PSS network layer protocol is removed and CSS control channel protocol added. End-to-end data integrity and flow control is not handled by NIC 14. It is up to the end points (i.e., CP 123 and terminal 131-1) to ensure proper data transmission and reception.

It is contemplated that CSS 12 may connect via multiple NICs 14 to interface to multiple PSS 13 systems. In such an arrangement, uniform dialing would require each terminal of each system to have a unique dialable number. Terminal location table 201 would specify which system contains which terminals.

Thus, a call from a terminal on CSS 12 to a terminal on any of the PSS system terminals would take place as previously described. However, in such an arrangement, a call between terminals on each of the PSS system could be made through gateway circuits on the PSS system themselves without utilizing CSS 12.

What has been described is merely illustrative of one embodiment of the principles of the present invention. Other methods, sequences or circuits can be used by those skilled in the art to implement the present invention without departing from the spirit and scope of the present invention.

What is claimed is:

1. A circuit for interfacing a packet switched system to a circuit switched system, said packet switched system including a first type terminal and said circuit switched system including a plurality of second type terminals and a call processor for establishing data calls between said second type terminals, said interface circuit comprising
   means for receiving a first control message from said first type terminal of said packet switched system requesting access to said circuit switched system, and
   means for converting said first control message into a second control message for accessing said call processor of said circuit switched system.

2. The interface circuit of claim 1 wherein said first control message is a command message for controlling said call processor of said circuit switched system.

3. The interface circuit of claim 1 wherein said first control message is a unique second type terminal address for establishing an inter-system data call between said first type terminal and one of said second type terminals identified by said unique second type terminal address.

4. The interface circuit of claim 3 wherein said first control message includes only one call set-up sequence for establishing said inter-system data call between said first type terminal and one of said plurality of second type terminals.

5. The interface circuit of claim 1 wherein said receiving means is a network access unit of said packet switched system.

6. The interface circuit of claim 5 wherein said converting circuit is a port circuit of said circuit switched system.

7. The interface circuit of claim 6 wherein said converting circuit further includes
   one or more data converter circuits for providing data communications between said network access unit and said port circuit and
   means for assigning each of said data converters to a different inter-system data call.

8. An interface circuit for interfacing a packet switched system to a circuit switched system, said packet switched system including a plurality of first type terminals, each of said plurality of first type terminals arranged for establishing a data call to another of said plurality of first type terminals using a first call set-up message, and said circuit switched system including a plurality of second type terminals and a call processor for establishing a data call between two of said plurality of second type terminals using a second call set-up message, said interface circuit comprising
   means responsive to said first call set-up message including a single-stage call set-up sequence originating from one of said plurality of first type terminals of said packet switched system for identifying one of said plurality of second type terminals as a destination terminal for a first inter-system data call,
   means responsive to said second call set-up message including a single-stage call set-up sequence originating from one of said plurality of second type terminals of said circuit switched system for identifying one of said plurality of first type terminals of said packet switched system as a destination terminal for a second inter-system data call, and
   means for converting said first call set-up message to said second call set-up message and outputting it to said circuit switched system to establish said first inter-system data call and for converting said second call set-up message to said first call set up message and outputting it to said packet switched system to establish said second inter-system data call.

9. The interface circuit of claim 8 including
   table means for storing the system location of all terminals of said circuit switched system and said packet switched system and
   means for checking said table means to determine the system location of a destination terminal identified in said first and second call set-up messages.

10. The interface circuit of claim 9 wherein each of said first type terminals and each of said second type terminals have a unique call set-up address.

* * * * *